US010579517B2

(12) United States Patent
Berke et al.

(10) Patent No.: US 10,579,517 B2
(45) Date of Patent: Mar. 3, 2020

(54) SYSTEM AND METHOD FOR PROVIDING PER CHANNEL FREQUENCY OPTIMIZATION IN A DOUBLE DATA RATE MEMORY SYSTEM

(71) Applicant: DELL PRODUCTS, LP, Round Rock, TX (US)

(72) Inventors: Stuart Allen Berke, Austin, TX (US); Vadhiraj Sankaranarayanana, Austin, TX (US); Bhyrav M. Mutnury, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/924,931

(22) Filed: Mar. 19, 2018

(65) Prior Publication Data
US 2019/0286554 A1    Sep. 19, 2019

(51) Int. Cl.
*G06F 13/16* (2006.01)
*G06F 12/02* (2006.01)

(52) U.S. Cl.
CPC ...... *G06F 12/0246* (2013.01); *G06F 13/1684* (2013.01); *G06F 13/1689* (2013.01)

(58) Field of Classification Search
CPC .. G06F 12/02; G06F 12/0246; G06F 13/1684; G06F 13/1689

USPC ..................................................... 711/5, 151
See application file for complete search history.

(56) References Cited

U.S. PATENT DOCUMENTS

| | | | |
|---|---|---|---|
| 6,134,638 A | 10/2000 | Olarig et al. | |
| 8,855,969 B2 | 10/2014 | Berry, Jr. et al. | |
| 2004/0027867 A1* | 2/2004 | Barr | G06F 1/20 365/193 |
| 2005/0192788 A1* | 9/2005 | Hobson | G06F 1/3203 703/22 |
| 2013/0013887 A1 | 1/2013 | Sugahara et al. | |
| 2014/0040696 A1 | 2/2014 | Johnson | |
| 2016/0125923 A1* | 5/2016 | Lee | G06F 13/1684 365/226 |
| 2016/0179375 A1* | 6/2016 | Kirvan | G06F 12/0246 711/153 |

* cited by examiner

*Primary Examiner* — Than Nguyen
(74) *Attorney, Agent, or Firm* — Larson Newman, LLP

(57) ABSTRACT

An information handling system includes a first Dual In-Line Memory Module (DIMM) on a first memory channel of the information handling system, and a second DIMM on a second memory channel of the information handling system. A processor trains the first memory channel to a first speed based upon a first performance level of the first DIMM, trains the second memory channel to a second speed based upon a second performance level of the second DIMM, and allocates a portion of the first DIMM to the application based upon the first speed.

14 Claims, 3 Drawing Sheets

SYSTEM AND METHOD FOR PROVIDING PER CHANNEL FREQUENCY OPTIMIZATION IN A DOUBLE DATA RATE MEMORY SYSTEM

FIELD OF THE DISCLOSURE

This disclosure generally relates to information handling systems, and more particularly relates to providing per channel frequency optimization in a double data rate memory system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first Dual In-Line Memory Module (DIMM) on a first memory channel of the information handling system, and a second DIMM on a second memory channel of the information handling system. A processor may train the first memory channel to a first speed based upon a first performance level of the first DIMM, train the second memory channel to a different second speed based upon a second performance level of the second DIMM, and allocate a portion of the first DIMM to an application based upon the first speed.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
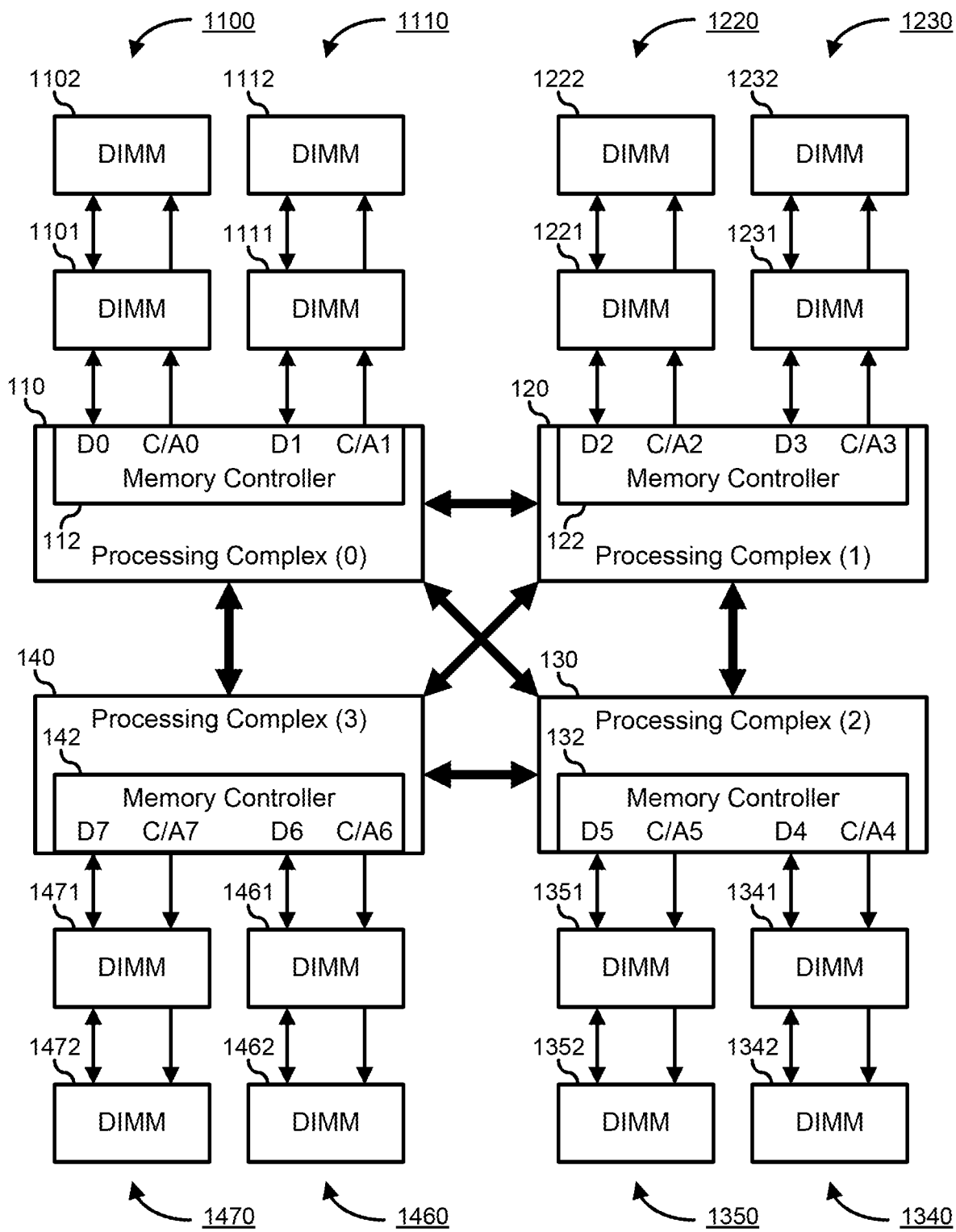
FIG. 1 is a block diagram illustrating an information handling system that has a eight-channel architecture according to an embodiment of the present disclosure.

FIG. 1 illustrates an information handling system 100 that includes four processing complexes 110, 120, 130, and 140 that are interconnected by high-speed, point-to-point data links. Processing complexes 110, 120, 130, and 140 each represent the hardware, software, firmware, and other elements associated with the performance of the processing tasks associated with information handling system. As such, processing complexes 110, 120, 130, and 140 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. An example of a high-speed, point-to-point data link includes an Intel UltraPath Interconnect (UPI), an AMD External Global Memory Interface (xGMI), a Cache-Coherent Interface for Accelerators (CCIX) interface, or another high-speed, point-to-point data interface that supports hardware managed cache coherency, as needed or desired. Processing complexes 110, 120, 130, and 140 each include respective memory controllers 112, 122, 132, and 142.

Memory controllers 112, 122, 132, and 142 are each configured to implement a two-channel memory architecture. As such, memory controller 112 implements memory channels 1100 and 1110, memory controller 122 implements memory channels 1220 and 1230, memory controller 132 implements memory channels 1340 and 1350, and memory controller 142 implements memory channels 1460 and 1470. Memory channel 1100 is configured as channel 0 of information handling system 100, memory channel 1110 is configured as channel 1, memory channel 1220 is configured as channel 2, memory channel 1230 is configured as channel 3, memory channel 1340 is configured as channel 4, memory channel 1350 is configured as channel 5, memory channel 1460 is configured as channel 6, and memory channel 1470 is configured as channel 7. Each of memory channels 1100, 1110, 1220, 1230, 1340, 1350, 1460, and 1470 support up to two Dual In-Line Memory Modules (DIMMs). Thus memory channel 1100 supports DIMM 1101 and 1102, memory channel 1110 supports DIMM 1111 and 1112, memory channel 1220 supports DIMM 1221 and 1222, memory channel 1230 supports DIMM 1231 and 1232, memory channel 1340 supports DIMM 1341 and 1342, memory channel 1350 supports DIMM 1351 and 1352, memory channel 1460 supports DIMM 1461 and 1462, and memory channel 1470 supports DIMM 1471 and 1472. Each channel includes a data bus (D#) and a control/address bus (C/A#). Memory channels 1100, 1110, 1220, 1230, 1340, 1350, 1460, and 1470 represent memory channels in accordance with a Double-Data Rate (DDR) memory standard, including current and future memory standards for DDR synchronous dynamic random access memory (SDRAM), such as the Joint Electronic Device Engineering Council (JEDEC) DDR4-2666 standard, DDR4-2933 standard, the DDR4-3200 standard. In particular, memory channel 1100, 1110, 1220, 1230, 1340, 1350, 1460, and 1470 may represent a fourth generation (DDR4) memory channel, a fifth generation (DDR5) memory channel, or beyond. It will be understood that the provision of two (2) memory channels per processing complex is used for illustration purposes, and that more or fewer memory channels per processing complex may be utilized in conjunction with the teaching of this specification. Moreover, it will be understood that where the memory channels are in accordance with a fifth generation DDR5 standard, that each DIMM provide two (2) separate memory channels.

DIMMs 1100-1472 may represent various types of DRAM DIMMs, such as unbuffered DIMMs (UDIMMs), registered DIMMs (RDIMMs), load reduced DIMMs (LRDIMMs), or other types of DRAM DIMMs, as needed or desired. DIMMs 1100-1472 may further represent various types of non-volatile DIMMs (NVDIMMs) such NVDIMM-F DIMMs, NVDIMM-N DIMMs, NVDIMM-P DIMMs, or another type of NVDIMM, as needed or desired. Further, DIMMs 1100-1472 may represent various types of storage class memories (SCMs) such as 3D XPoint or another phase-change memory DIMMs, resistive-RAM (Re-RAM) DIMMs, spin transfer torque magnetic RAM (STT-MRAM) DIMMs, or another type of SCM DIMM, as needed or desired. In particular, information handling system 100 may utilize a combination of DIMM types to accommodate a wide variety of storage needs for various applications, processes, or functions, as needed or desired. For example, a portion of DIMMs 1100-1472 may be selected for speed of access, another portion may be selected for data retention and permanence, while still other portions may be selected for other characteristic features of the particular DIMMs used. Moreover, one or more of DIMMs 1100-1472 may be unpopulated, for example, in order to minimize the cost of information handling system 100.

As the speed of memory channels increases over time, and the number of channels supported by processors and processing complexes increases, the topology of memory channels becomes increasingly subject to the effects of various signal degradations, such as crosstalk, aggressors, circuit path discontinuities, and other marginalities. For example, DDR4 memory is specified to reach speeds of 3200 metatransfers per second (MT/s), while DDR5 memory is expected to launch at 4000 MT/s and to achieve up to 6400 MT/s. Meanwhile, the types and varieties of DIMMs is expected to increase with new types of NVDIMM and SCM coming to market, leading to even further fracturing of the maximum speeds attainable on the various types of DIMMs. Further, various information handling system vendors are marketing systems that operate at speeds in excess of the Plan of Record (POR) supported speed validated by CPU, processor, or memory suppliers (POR+). With such a proliferation of maximum speeds available with any particular memory configuration, the ability to maintain a common memory channel speed across any given processing complex, much less across an entire system is increasingly costly in terms of system performance.

Figure 2:
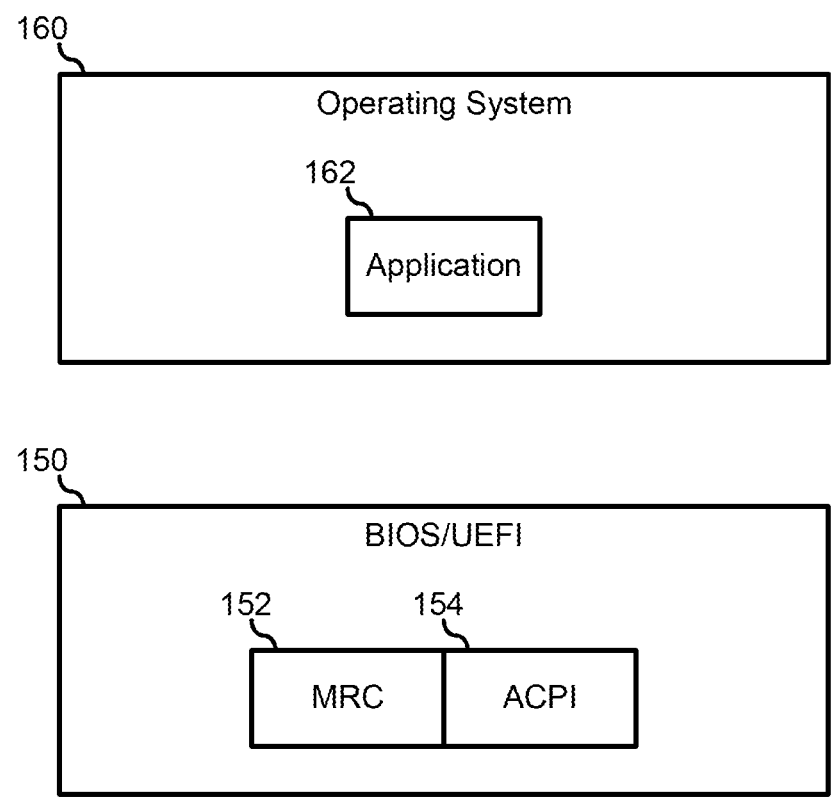
FIG. 2 is a functional diagram of the information handling system of FIG. 1.

FIG. 2 shows a functional view of information handling system 100. Here, the elements of information handling system 100, as depicted in FIG. 1, operate to execute various functional code, including a Basic Input Output System/Universal Extensible Firmware Interface (BIOS/UEFI) 150, and an operating system 160. BIOS/UEFI 150 represents code to boot, initialize, and manage information handling system 100, and to provide basic functions for the various input/output devices of the information handling system. BIOS/UEFI 150 includes memory reference code (MRC) 152 and an Advanced Configuration and Power Interface (ACPI) table 154. MRC 152 is utilized to query DIMMs 1101-1472 to determine the type, storage capacity, functionality, and other aspects of the DIMMs, to initialize the memory map of information handling system 100, to test and verify the usability of the memory space of the DIMMs. As such, MRC 152 operates to read Serial Presence Detect (SPD) information from DIMMs 1101-1472 to determine the type, storage capacity, functionality, maximum rated transfer speed, and other information of the DIMMS.

An example of the speed information garnered from reading the SPD information is shown in Table 1, below. Here, in an exemplary memory configuration, RDIMMs are located in the DIMM socket of the respective memory channel 0-7 that is closest to the respective processing complex 110, 120, 130, or 140, and NVDIMMs are located in the DIMM socket of the respective memory channel 0-7 that is farthest from the respective processing complex. Moreover, several DIMM sockets are not populated with any DIMM.

TABLE 1

| Specified Maximum Operating Speed (MT/s) | | | | | | | |
|---|---|---|---|---|---|---|---|
| Ch0 | Ch1 | Ch2 | Ch3 | Ch4 | Ch5 | Ch6 | Ch7 |

| | Ch0 | Ch1 | Ch2 | Ch3 | Ch4 | Ch5 | Ch6 | Ch7 |
|---|---|---|---|---|---|---|---|---|
| RDIMM | 5200 | 5200 | 5200 | 5200 | 5200 | 5200 | 5200 | 5200 |
| NVDIMM | 5200 | 5200 | — | — | 4800 | — | — | — |

BIOS/UEFI 150 further operates to train the DIMMs on channels 1100-1470 at the rated speed garnered from reading the SPD information for each respective DIMM. If a particular DIMM is not able to be trained to the rated speed, then BIOS/UEFI 150 trains the DIMMs that are unable to achieve their highest rated speed at a next lower speed setting. This is continued until the highest attainable speed for all DIMMs in information handling system 100 are determined. An example of the speed information garnered from training the DIMMs is shown in Table 2, below.

TABLE 2

| Trained Maximum Operating Speed (MT/s) | | | | | | | |
|---|---|---|---|---|---|---|---|
| Ch0 | Ch1 | Ch2 | Ch3 | Ch4 | Ch5 | Ch6 | Ch7 |

| | Ch0 | Ch1 | Ch2 | Ch3 | Ch4 | Ch5 | Ch6 | Ch7 |
|---|---|---|---|---|---|---|---|---|
| RDIMM | 5200 | 5200 | 5200 | 5200 | 4800 | 5200 | 5200 | 5200 |
| NVDIMM | 4400 | 4800 | — | — | 4800 | — | — | — |

After training determines the maximum operating speeds of the DIMMs of information handling system 100, BIOS/UEFI 150 operates to set an operating speed for each of memory channels 1100-1470. An example of channel speeds as set by BIOS/UEFI 150 is given in Table 3. As a first step, BIOS/UEFI 150 sets a particular channel to the speed of the slowest DIMM on the channel. For example, from Table 2, channel 0 includes a RDIMM that was trainable to 5200 MT/s and a NVDIMM that was trainable to 4400 MT/s. Here, BIOS/UEFI 150 sets channel 0 to operate at the speed of the slowest DIMM on channel 0, i.e., to 4400 MT/s.

TABLE 3

| | Selected Operating Speed (MT/s) | | | | | | | |
|---|---|---|---|---|---|---|---|---|
| | Ch0 | Ch1 | Ch2 | Ch3 | Ch4 | Ch5 | Ch6 | Ch7 |
| RDIMM | 4400 | 4400 | 5200 | 5200 | 4800 | 4800 | 5200 | 5200 |
| NVDIMM | 4400 | 4400 | — | — | 4800 | — | — | — |

In a next step, BIOS/UEFI 150 determines if any of channels 0-7 are to be operated as interleaved memory channels, and sets all interleaved channels to the speed of the slowest channel of the interleaved group of channels. For example, channels 0 and 1, and channels 4 and 5 may be operated as interleaved groups. Here, because the slowest DIMM of the interleaved group including channels 0 and 1 was only able to be trained to 4400 MT/s, then both of channels 0 and 1 are operated at 4400 MT/s. Similarly, because the slowest DIMM of the interleaved group including channels 4 and 5 was only able to be trained to 4800 MT/s, then both of channels 0 and 1 are operated at 4800 MT/s. After BIOS/UEFI 150 has set the memory channel speeds, the BIOS/UEFI conveys information regarding the set memory channel speeds to ACPI table 154.

When BIOS/UEFI 150 is done booting, and initializing information handling system 100, the BIOS/UEFI invokes a boot loader to pass operation of the information handling system to operating system 160. Operating system 160 represents code that operates and manages the functions of information handling system 100 when BIOS/UEFI 150 is done booting and initializing the information handling system. In particular, operating system 160 operates to launch, allocate resources, and mange an applications 162. Typically, when application 162 needs to access memory of information handling system, the application makes a memory allocation request to operating system 160, and the operating system operates to reserve one or more portions of the memory map of the information handling system, that is, the memory space provided by DIMMs 1100-1472, to the use of the application.

In a particular embodiment, operating system 160 operates to read the memory channel speed information from ACPI table 154 and to determine which memory channels operate at the highest speed. Then, when application 162 is launched, operating system 160 determines a memory channel to allocate to the application or to a function of the application based upon that memory channel's operating speed. In another case, application 162 requests the memory channel speed information from operating system 160 and then specifically requests a memory allocation from a particular memory channel based upon the memory channel speed information.

In another embodiment, operating system 160 further determines memory latency information from DIMMs 1100-1472, such as by reading latency information from ACPI table 154, by directly accessing SPD information from the DIMMs, or otherwise, as needed or desired. Here, operating system 160 further determines a real access time for each of DIMMs 1100-1472 based upon each DIMMs latency information and upon the operating speed of the memory channel that the DIMM is installed in. In this way, operating system 160 can prioritize each of DIMMs 1100-1472 in terms of an amount of time to execute memory operations on each DIMM. Here, when application 162 is launched, operating system 160 determines a DIMM to allocate to the application or to a function of the application based upon that DIMM's access time. In another case, application 162 requests the DIMM access time information from operating system 160 and then specifically requests a memory allocation from a particular DIMM based upon the access time information. In this way, information handling system 100 operates to improve the overall performance of the information handling system, for example by allocating more frequently accessed data in faster DIMMs or on faster memory channels.

Figure 3:
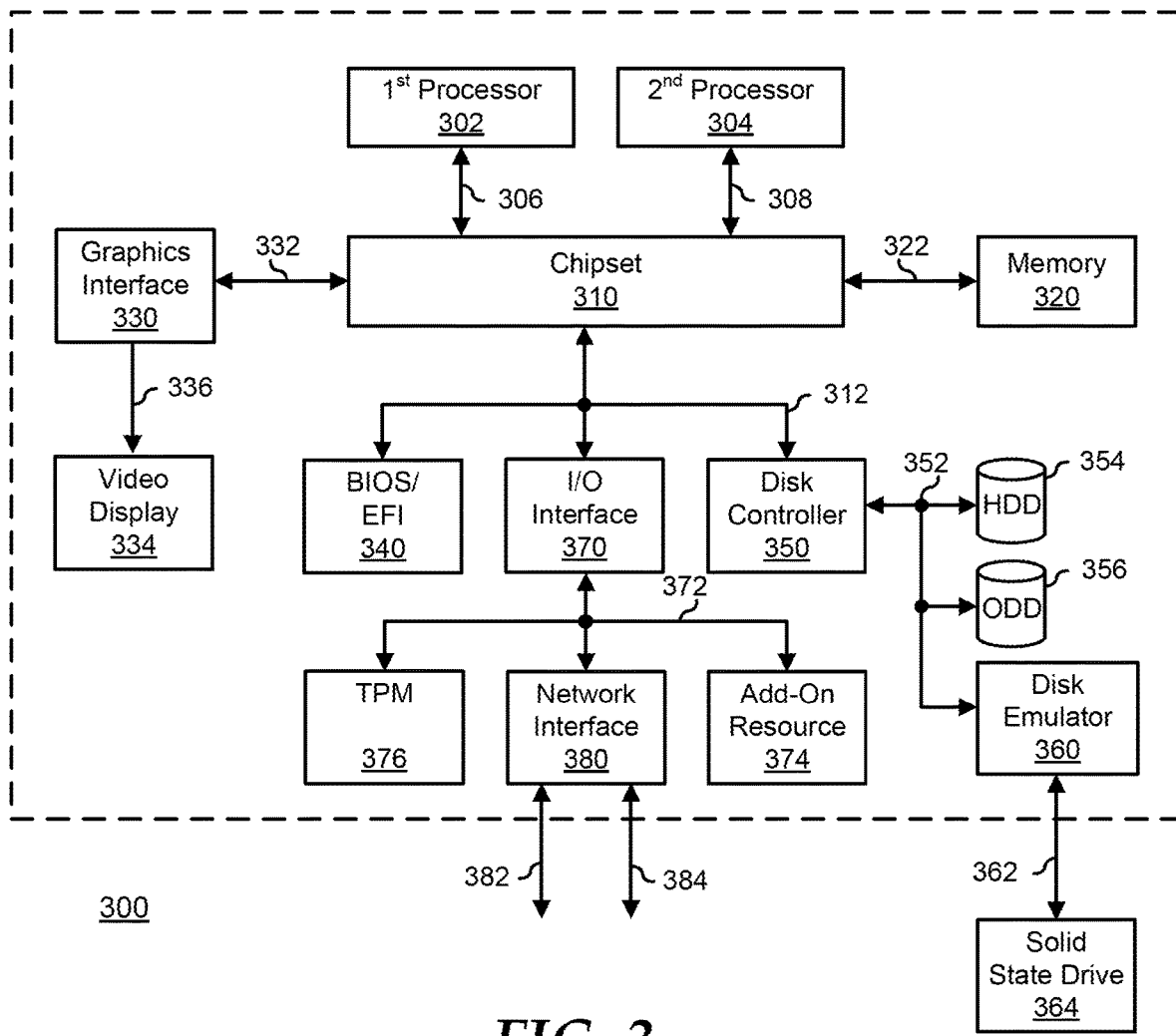
FIG. 3 is a block diagram illustrating a generalized information handling system according to an embodiment of the present disclosure.

FIG. 3 illustrates a generalized embodiment of an information handling system 300 similar to information handling system 100. For purpose of this disclosure information handling system 300 can be configured to provide the features and to perform the functions of the OPF system as described herein. Information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, a chipset 310, a memory 320, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an input/output (I/O) interface 370, one or more add-on resources 374, a trusted platform module (TPM) 376, a network interface 380, a management device 390, and a power supply 395. Processors 302 and 304, chipset 310, memory 320, graphics interface 330, BIOS/UEFI module 340, disk controller 350, HDD 354, ODD 356, disk emulator 360, SSD 362, I/O interface 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 may include a commercially available BMC product that operates in accordance with an Intelligent Platform Management Initiative (IPMI) specification, such as a Integrated Dell Remote Access Controller (iDRAC), or the like. Management device 390 may further include associated memory devices, logic devices, security devices, or the like, as needed or desired.

Power supply 395 represents one or more devices for power distribution to the components of information handling system 300. In particular, power supply 395 can include a main power supply that receives power from an input power source, such as a wall power outlet, a power strip, a battery, or another power source, as needed or desired. Here, power source 395 operates to convert the power at a first voltage level from the input power source to one or more power rails that are utilized by the components of information handling system. Power supply 395 can also include one or more voltage regulators (VRs) that each receive power from the main power supply and that operate to convert the input voltage to an output voltage that is used by one or more components of information handling system. For example, a VR can be provided for each of processors 302 and 304, and another VR can be provided for memory 320. Power supply 395 can be configured to provide a first power plane that provides power to the host environment, and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first Dual In-Line Memory Module (DIMM) on a first memory channel of the information handling system;
   a second DIMM on a second memory channel of the information handling system; and
   a processor configured to:
      train the first memory channel to a first speed based upon a first performance level of the first DIMM;
      train the second memory channel to a second speed based upon a second performance level of the second DIMM, the first speed different from the second speed;
      launch a first application;
      allocate a first portion of the first DIMM to the first application based upon the first speed;
      receive first speed information for the first memory channel;
      receive second speed information for the second memory channel;
      store the first and second speed information to an Advanced Configuration and Power Interface (ACPI) table; and
      ascribe a first priority level to the first DIMM and a second priority level to the second DIMM based upon the first and second speed information in the ACPI table, wherein the first priority level is higher than the second priority level.

2. The information handling system of claim 1, the processor further configured to:
   receive a memory allocation request from the first application, the memory allocation request including a request to allocate memory that is ascribed the first priority level.

3. The information handling system of claim 2, wherein the processor allocates the first portion of the first DIMM to the first application based upon the request.

4. The information handling system of claim 1, the processor further configured to:
   launch a second application; and
   allocate a second portion of the second DIMM to the second application based upon second speed.

5. The information handling system of claim 1, further comprising:
   a memory controller including the first and second memory channels, wherein in training the first and second memory channels, the processor is configured to direct the memory controller to train the first and second memory channels.

6. The information handling system of claim 1, wherein the first and second DIMMs are Double-Data Rate (DDR) DIMMs.

7. A method of allocating a first memory channel of an information handling system and a second memory channel of the information handling system, the method comprising:
   training, by a processor of the information handling system, the first memory channel to a first speed based upon a first performance level of a first Dual In-Line Memory Module (DIMM) on the first memory channel;
   training, by the processor, the second memory channel to a second speed based upon a second performance level of a second DIMM on the second memory channel, the first speed different from the second speed;
   launching, by the processor, a first application;
   allocating a first portion of the first DIMM to the first application based upon the first speed;
   receiving, by the processor, first speed information for the first memory channel;
   receiving, by the processor, second speed information for the second memory channel;
   storing, by the processor, the first and second speed information to an Advanced Configuration and Power Interface (ACPI) table; and
   ascribing, by the processor, a first priority level to the first DIMM and a second priority level to the second DIMM based upon the first and second speed information in the ACPI table, wherein the first priority level is higher than the second priority level.

8. The method of claim 7, further comprising:
   receiving, by the processor, a memory allocation request from the first application, the memory allocation request including a request to allocate memory that is ascribed the first priority level.

9. The method of claim 8, wherein the processor allocates the first portion of the first DIMM to the first application based upon the request.

10. The method of claim 7, further comprising:
    launching, by the processor, a second application; and
    allocating, by the processor, a second portion of the second DIMM to the second application based upon second speed.

11. An information handling system, comprising:
    a first Dual In-Line Memory Module (DIMM) on a first memory channel of the information handling system;
    a second DIMM on a second memory channel of the information handling system; and
    a first processor configured to train the first memory channel to a first speed based upon a first performance level of the first DIMM; and
    a second processor configured to:

train the second memory channel to a second speed based upon a second performance level of the second DIMM, the first speed different from the second speed;
launch a first application;
allocate a first portion of the first DIMM to the first application based upon the first speed;
receive first speed information for the first memory channel;
receive second speed information for the second memory channel;
store the first and second speed information to an Advanced Configuration and Power Interface (ACPI) table; and
ascribe a first priority level to the first DIMM and a second priority level to the second DIMM based upon the first and second speed information in the ACPI table, wherein the first priority level is higher than the second priority level.

12. The information handling system of claim 11, the second processor further configured to:
receive a memory allocation request from the first application, the memory allocation request including a request to allocate memory that is ascribed the first priority level.

13. The information handling system of claim 12, wherein the second processor allocates the first portion of the first DIMM to the first application based upon the request.

14. The information handling system of claim 11, the second processor further configured to:
launch a second application; and
allocate a second portion of the second DIMM to the second application based upon second speed.

* * * * *